United States Patent
Melzig et al.

(10) Patent No.: US 10,464,299 B2
(45) Date of Patent: Nov. 5, 2019

(54) METHODS AND PRODUCTION SYSTEM FOR LAMINATING INTERIOR COMPONENTS IN VEHICLES

(71) Applicant: Bayerische Motoren Werke Aktiengesellschaft, Munich (DE)

(72) Inventors: Joachim Melzig, Landshut (DE); Gerald Meindl, Postau (DE); Stefan Hobelsberger, Neufahrn (DE); Sebastian Alt, Simpsonville (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 95 days.

(21) Appl. No.: 15/225,891

(22) Filed: Aug. 2, 2016

(65) Prior Publication Data

US 2016/0339683 A1 Nov. 24, 2016

Related U.S. Application Data

(63) Continuation of application No. PCT/EP2015/055001, filed on Mar. 11, 2015.

(30) Foreign Application Priority Data

Apr. 8, 2014 (DE) .......................... 10 2014 206 751

(51) Int. Cl.
*B32B 37/12* (2006.01)
*B32B 39/00* (2006.01)
(Continued)

(52) U.S. Cl.
CPC .......... *B32B 37/12* (2013.01); *B32B 37/0053* (2013.01); *B32B 38/1833* (2013.01);
(Continued)

(58) Field of Classification Search
CPC ..... B32B 37/0053; B32B 37/10; B32B 37/12; B32B 37/14; B32B 39/00; B32B 2605/003; B60R 13/02
(Continued)

(56) References Cited

U.S. PATENT DOCUMENTS 5,326,417 A * 7/1994 Phelps ................. B29C 63/025
100/237
2010/0043689 A1* 2/2010 Madsen ................ B26F 1/3813
114/102.29
(Continued)

FOREIGN PATENT DOCUMENTS

CN 102869560 A 1/2013
CN 103648752 A 3/2014
(Continued)

OTHER PUBLICATIONS

Translation of EP 2415601 A2, published Feb. 8, 2012, Alfred Waas et al.*
(Continued)

*Primary Examiner* — George R Koch
(74) *Attorney, Agent, or Firm* — Crowell & Moring LLP

(57) ABSTRACT

Methods are provided for laminating interior components in vehicles, the methods include the acts of: providing at least one laminating element; providing at least one laminant; providing at least one interior component; laminating the interior component with the laminating element and the laminant, the lamination of the interior component with the laminating element and the laminant being performed in a substantially continuous process.

14 Claims, 1 Drawing Sheet

(51) Int. Cl.
  *B32B 37/00* (2006.01)
  *B60R 13/02* (2006.01)
  *B32B 38/18* (2006.01)
  *B32B 37/10* (2006.01)
  *B32B 37/14* (2006.01)

(52) U.S. Cl.
  CPC .............. *B32B 39/00* (2013.01); *B60R 13/02* (2013.01); *B32B 37/10* (2013.01); *B32B 37/1284* (2013.01); *B32B 37/14* (2013.01); *B32B 2605/003* (2013.01)

(58) Field of Classification Search
  USPC .......................................... 156/64, 538, 556
  See application file for complete search history.

(56) References Cited

U.S. PATENT DOCUMENTS

| | | |
|---|---|---|
| 2013/0306228 A1 | 11/2013 | Buehlmeyer |
| 2014/0119935 A1 | 5/2014 | Daenekas et al. |

FOREIGN PATENT DOCUMENTS

| | | |
|---|---|---|
| DE | 196 24 239 A1 | 1/1998 |
| DE | 10 2004 027 545 A1 | 12/2005 |
| DE | 10 2010 035 382 A1 | 2/2012 |
| EP | 2 415 601 A2 | 2/2012 |

OTHER PUBLICATIONS

International Search Report (PCT/ISA/210) issued in PCT Application No. PCT/EP2015/055001 dated Jul. 23, 2015 with English translation (five pages).
German-language Written Opinion (PCT/ISA/237) issued in PCT Application No. PCT/EP2015/055001 dated Jul. 23, 2015 (seven pages).
German Search Report issued in counterpart German Application No. 10 2014 206 751.0 dated Dec. 8, 2014 with partial English translation (11 pages).
Chinese-language Office Action issued in counterpart Chinese Application No. 201580004005.4 dated Mar. 13, 2017 with English translation (Fifteen (15) pages).

\* cited by examiner

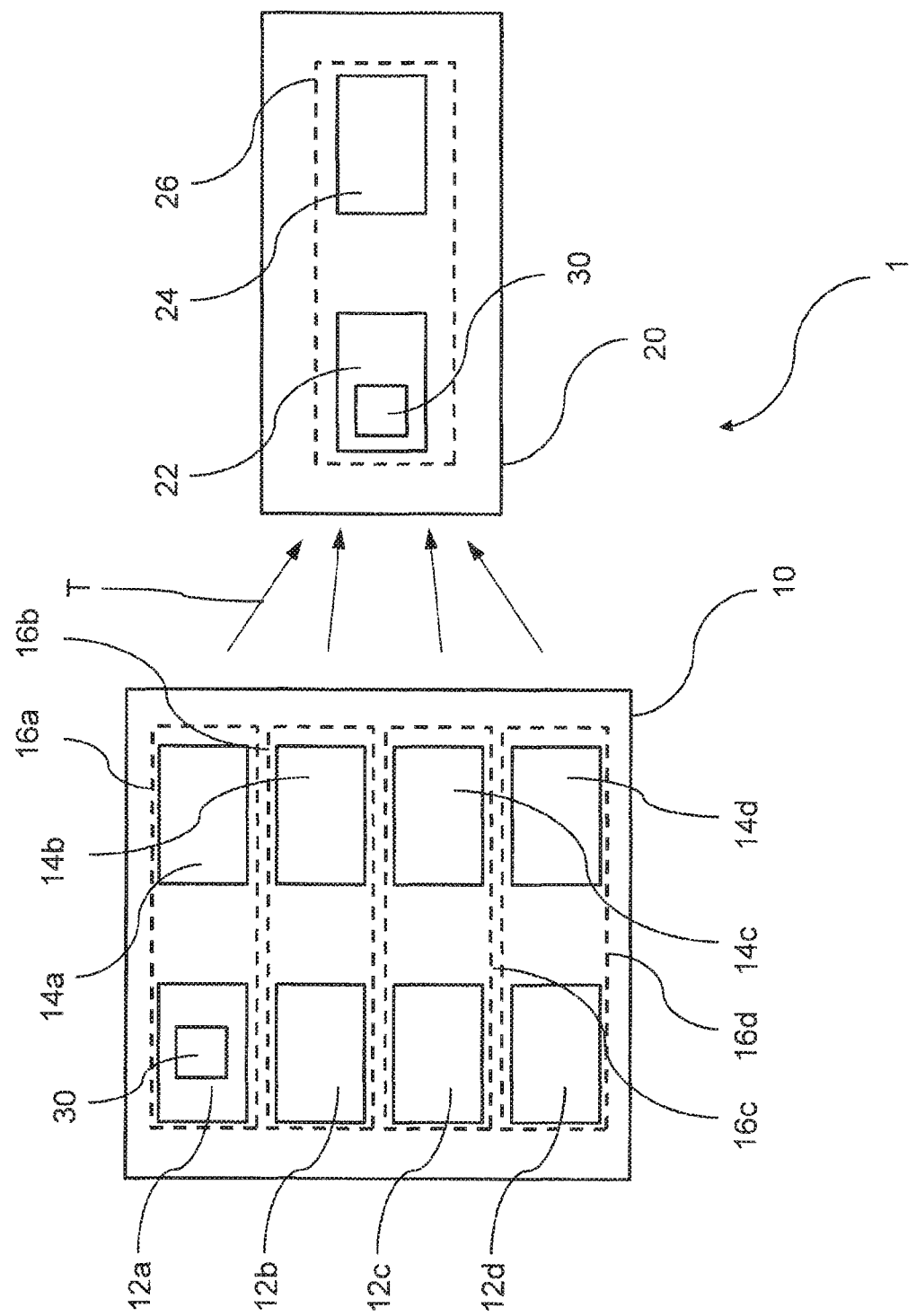

METHODS AND PRODUCTION SYSTEM FOR LAMINATING INTERIOR COMPONENTS IN VEHICLES

CROSS REFERENCE TO RELATED APPLICATIONS

This application is a continuation of PCT International Application No. PCT/EP2015/055001, filed Mar. 11, 2015, which claims priority under 35 § 119 from German Patent Application No. 10 2014 206 751.0, filed Apr. 8, 2014, the entire disclosures of which are herein expressly incorporated by reference.

BACKGROUND AND SUMMARY OF THE INVENTION

The present invention relates to a method for laminating interior components of vehicles, particularly to a method of laminating instrument panels as well as to a production system for implementing a method of laminating interior components of vehicles.

It is basically known that trim parts of vehicles, such as instrument panels, are laminated by means of usually layer-type laminating elements, for example, real leather, imitation leather or textiles, while using suitable lamination agents, such as varnish, glue or wax. In this case, the lamination agent is used as an adhesive for achieving a durable fixing of the laminating element on the trim part.

During the lamination, at least two layers of identical or different materials are mutually connected layer by layer, so that a first layer at least partially covers a second layer. In automobile construction, plastic preforms, for example, made of polyurethane foam, provided, for example, for the interior paneling, are laminated by use of films in order to achieve a particularly esthetic and/or functional effect, for example, in order to protect the surface of plastic preforms from outside influences. For this purpose, as a rule, a plurality of individual processes are required, which are successively implemented at different work stations. In this case, intermediate products are conveyed from one work station to the next work station by way of suitable conveying devices. As an alternative, several or all individual processes are implemented at one work station.

In the case of known methods for laminating interior components of vehicles, it is a disadvantage that the entire production capacity of a production system for producing laminated interior components is highly limited because some work stations operate at their capacity limit and other work stations are not fully utilized. For increasing the production capacity, as a rule, parallel-operation manufacturing systems are therefore provided for laminating interior components in order to meet production requirements. Considerable investments are sometimes necessary for this purpose, which have a negative effect on the profit of the enterprise.

It is therefore an object of the present invention to at least partially eliminate the above described disadvantages in a cost-effective and simple manner. In particular, it is an object of the present invention to provide a method of laminating interior components of vehicles, by which, compared to conventional methods of the above-mentioned type, the production capacity of existing production facilities is considerably increased. Furthermore, it is an object of the present invention to provide a production system for implementing the method according to the invention.

The above-mentioned object is achieved by a method for laminating interior components, as well as by a production system for laminating interior components, in accordance with embodiments of the invention. In this case, characteristics and details, which are described in connection with the method according to the invention for laminating interior components, naturally also apply in connection with the production system according to the invention and, in each case, vice-versa, so that reference is and can always be made reciprocally with respect to the disclosure concerning the individual aspects of the invention.

A method according to the invention for laminating interior components of vehicles includes the following acts:
  providing at least one laminating element, at least one lamination agent and at least one interior component;
  arranging the laminating element on a support element in a first main process;
  fixing the laminating element on an interior component while solidifying the lamination agent in a second main process, the lamination agent being arranged between the laminating element and the interior component.

In this case, the first main process is implemented in a first production stage and the second main process is implemented in a second production stage of a production system, in which case, several first main processes are implemented in a parallel fashion in the first production stage, so that the first production stage and the second production stage ideally have an essentially equally high production capacity. Compared to conventional methods of laminating interior components, this method has the advantage that all production stages can be utilized to their maximum capacity, because they have the same production capacity. As a result of the "parallelizing" of so-called bottleneck processes, which include the first main process, because it is significantly more time-intensive than the second main process, the operational capacity of the production system is clearly increased. When the coordination of the first production stage with the second production stage is optimal, during the lamination of an arbitrary number of interior components, the operating time of the first production stage will correspond essentially to the operating time of the second production stage.

In order to adapt the production capacity of the first production stage to the production capacity of the second production stage, the ratio of the parallel-implemented first main processes to the number of the parallel-implemented second main processes may preferably correspond to the ratio of the duration of the first main process to the second main process. In the simplest case, only one second main process will be implemented. In the case of a duration of, for example, 1 minute for a first main process and a duration of, for example, 15 seconds for the second main process, for each implemented second main process, preferably four first main processes would therefore have to be implemented in parallel. In this manner, the production capacities of all production stages can be optimally utilized. The material flows of the intermediate products of the first main process subsequently have to be merged to form the material flow of the second production stage. Preferably, parallel-implemented first main processes are implemented in a phase-shifted manner with respect to time, so that the intermediate products of the parallel-operating work stations of the first production stage will be finished at different times and guided to the second production stage. This phase shifting is particularly preferably selected such that a time period between the finishing of an intermediate product and of the next finished intermediate product in the first production stage will essentially be constant for the intermediate products that follow. The finished intermediate products can thereby particularly easily be merged to form a material flow and do not have to be intermediately stored in a buffer.

According to the invention, the lamination agent can be applied directly to the interior component or the laminating element, for example, by a sprayed application. The lamination agent can preferably be activated by temperature, preferably approximately 60° C., and/or by pressure, i.e. the lamination agent will develop its bonding effect only under corresponding physical conditions. Here, the lamination agent can soften, for example, starting at a temperature of approximately 60° C., so that it can easily be connected with the laminating element and the interior component, and can harden at a lower temperature. This process is preferably irreversible, so that, when the lamination agent is again heated to 60° C. or higher, it will not soften again. Since interior components of passenger cars are often exposed to intensive sun exposure for long time periods, this is advantageous because a detachment of the laminating element as a result of excessive heating is to be avoided. The application of the lamination agent can take place directly to the interior component and/or to the laminating element.

The second production stage preferably has a laminating facility with an integrated conveying device, particularly a rotary table and/or an automated assembly line. The laminating facility is preferably constructed such that the conveying device moves along continuously, and a fixing station integrated in the laminating facility or parts of this fixing station, such as pressing tools, move along with the conveying device during a process step. An essentially continuous second main process can thereby be achieved. As an alternative, the integrated conveying device may be stopped for the duration of one work cycle. In this case, the work stations are arranged in the laminating facility preferably in an essentially stationary fashion.

In an advantageous embodiment of the method, the first main process carries out a positioning and an alignment of the laminating element on the support element. As a result, a relative position of the laminating element with respect to the support element is defined. This has the advantage that, when the position of the support element is known, the position of the laminating element is also known, and an alignment of the laminating element required for the second main process can take place by a corresponding alignment of the support element, which, as a rule, is clearly less time-intensive than an alignment of the laminating element. This saving of time permits a higher timing of the second main process and, thereby, a better utilization of the second production stage.

The support element is preferably constructed as an interior component. This has the advantage that a work step of arranging the support element (having the laminating element arranged on it) on the interior component does not take place, and the efficiency of the method is thereby further increased. In this case, it is preferred that, before arranging the laminating element on the interior component, the lamination agent is applied to the surface of the interior component that is to be laminated and/or to an adhesive side of the laminating element.

As an alternative thereto, it may be advantageous for the support element to have a topography that corresponds to an inverse image of the surface of the interior component to be laminated, and the laminating element is correspondingly arranged on the support element, so that, during the assembling of the support element with the interior component, the laminating element has a position that is predefined relative to the interior component. As a result, an aligning of the laminating element on the interior component becomes possible by an aligning of the support element with the interior component. Because of the shaping of the support element, an aligning of the support element with the interior component is significantly simpler and thereby faster than an aligning of the laminating element with the interior component.

A further advantage can be achieved if, during the arranging (or after the arranging) on the support element, the laminating element is fixed to the latter in a reversible manner, particularly by way of a clamping device or a temporary adhesion. It is thereby prevented that the position of the laminating element changes, for example, during the transport into the second production stage relative to the supporting element and the original position before the second main process has to be restored in order to avoid a faulty connection of the laminating element and the interior component as well as the additional expenses resulting therefrom.

Furthermore, it is advantageous for the arranging of the laminating element on the support element to take place on a mobile transport unit. Such transport units are also called "shuttles". The transport unit is further preferably constructed as a platform having a receiving device, on which the support element is deposited, so that at least a lateral motion of the support element relative to the platform will be prevented. The transport units can be preferably moved between the first production stage and the second production stage. Also preferably, the transport units can adapt their speed to the respective cycle rate of the first production stage or of the second production stage.

It may also be advantageous for the laminating element and/or the lamination agent to be subjected to at least one treatment process before the second main process on the transport unit, particularly to a thermal and/or chemical treatment. As a result, for example, the bonding effect of the lamination agent can be improved and/or the dimensional stability of the laminating element can be optimized, for example, in the case of a high increase in temperature as a result of sun exposure.

It is further advantageous for the solidification of the lamination agent to take place by pressure and/or temperature. It is further preferred that the pressure be applied to the laminating element by way of a top tool, a robot and/or a roller. Such lamination agents are particularly suitable for laminating interior components of a vehicle because high strength as well as temperature stability can be achieved by use of such lamination agents.

Another object of the present invention is a production system for the implementation of a method according to the invention for laminating interior components, the system including:

a plurality of transport units for receiving at least one interior component, respectively;

a plurality of arranging stations for arranging laminating elements on support elements, particularly interior components, the support elements being arranged on transport units, and a laminating facility having at least one fixing station for fixing laminating elements on the interior components.

Furthermore, the production system has at least twice as many arranging stations as fixing stations. Because arranging stations for the arrangement of laminating elements on support elements always have a longer throughput time than fixing stations, the production system according to the invention has the advantage, compared to conventional production systems, that a higher average utilization of the individual production stations can be achieved in the production operation, and the efficiency of the production system is thereby clearly increased.

The laminating machine preferably bon at least a top tool, a robot and/or a roller for pressing the lamination agent against the interior component.

By way of the production system according to the invention, the same advantages are achieved as were explained in detail with respect to the method according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic view of an embodiment of a production system according to the invention.

DETAILED DESCRIPTION OF THE DRAWING

FIG. 1 is a schematic view of an embodiment of a production system 1 according to the invention. The production system 1 is divided into a first production stage 10 and a second production stage 20. In the first production stage 10 laminating elements (not illustrated in this figure) are prepared for laminating interior components, while, in the second production stage 20, the laminating elements are permanently fixed to the interior components.

The first production stage 10 has four parallel-operating work stations for each individual process of the first main process to he implemented. For the process of supplying the laminating elements, four supplying stations 12*a*, 12*b*, 12*c*, 12*d* are provided. Depending on the demand, support elements and lamination agents (laminants) may also be provided in the supplying stations. This depends particularly on whether an arrangement of the laminating element on the interior components is to already take place in the first production stage 10—alternative 1—or in the second production stage 20—alternative 2—.

In the case of alternative 1, the supplying stations 12*a*, 12*b*, 12*c*, 12*d* are constructed for supplying the laminating elements, the lamination agents and the interior components. For this purpose, the supplying stations, for example, have a robot, particularly an articulated-arm robot, by which the corresponding components can be arranged on a receiving surface. For this purpose, first an interior component is placed on the receiving surface of a transport unit 30, so that the surface of the interior component to be laminated faces away from the transport unit. Subsequently, the laminating agent is applied. This can be done, for example, by spraying the laminating agent onto the surface to be laminated and/or onto an adhesive side of the laminating element, wherein the laminating element is then placed with the adhesive side onto the surface of the interior component to be laminated. Subsequently, the transport unit is moved to an aligning and fixing station 14*a*, 14*b*, 14*c*, 14*d*. A combination of supplying station 12*a*, 12*b*, 12*c*, 12*d* and the aligning and fixing station 14*a*, 14*b*, 14*c*, 14*d* is also called an arranging station 16, 16*b*, 16*c*, 16*d*.

In the illustrated example, the first production stage 10 has four aligning and fixing stations 14*a*, 14*b*, 14*c*, 14*d*. In the aligning and fixing station 14*a*, 14*b*, 14*c*, 14*d*, the laminating element moved on the interior component, for example, by articulated-arm robots, into a predefined relative position and is reversibly fixed on the interior component, so that the position of the laminating element relative to the interior component does not change. As an alternative, the first production stage 10 may also be constructed such that the supplying, the aligning and the fixing are implemented at a single universal work station, and that the first production stage 10 has several, for example, four of these universal work stations.

The production system has a conveying device in order to move the transport unit 30 in the transport direction T from the first production stage 10 into the second production stage 20. The conveying device is designed for merging transport units 30 of parallel-operating work stations of the first production stage 10 to form a linear flow of transport units 30, for example arranged behind one another, and feeding them to the second production stage 20. Depending on the use case and the capacity requirement, work stations can also be arranged parallel in the second production stage 20.

The second production stage 20 has a warming station 22 and a pressing station 24. A transport unit 30 moved into the second production stage 20 first reaches the warming station 22, in which the lamination agent can be activated, for example, at a temperature of approximately 60° C. From the warming station 22, the transport unit 30 can be moved into the pressing station 24. As an alternative, the pressing station 24 may also be arranged inside the warming station 22 or may be combined with the latter. A work station or a group of work stations of the second production stage 20, which causes a fixing of the laminating element to the interior component, is also called a fixing station 26.

The pressing station 24 has at least one pressure body, such as a top tool, a roller and/or a robot, by which the interior component can be pressed together with the laminating agent and the laminating element and can be fixed to one another. Furthermore, the pressing station 24 has an output for moving out the transport unit 30 with the finished laminated interior component arranged thereon. By way of a gripping arm robot, the finished laminated interior component can be removed from the transport unit 30 and the transport unit 30 can be returned to one of the supplying stations 12*a*, 12*b*, 12*c*, 12*d* in the first production stage 10.

In the case of alternative 2, the supplying stations 12*a*, 12*b*, 12*c*, 12*d* are designed for supplying the laminating elements and support elements, which are intended for the temporary fixing at the laminating elements. A suitable support element preferably has a surface called a holding surface, which corresponds essentially to an inverse image of the surface of the interior component to be laminated. The supplying stations, for example, have a robot, particularly an articulated-arm robot, by which the corresponding components can be arranged on a receiving surface. For this purpose, a support element is first deposited on the receiving surface of a transport unit 30, so that the holding surface of the support element faces away from the transport unit 30. Subsequently, the laminating element is placed with its side that faces away from its adhesive side onto the holding surface of the support element. The transport unit is then moved to the aligning and fixing stations 14*a*, 14*b*, 14*c*, 14*d*.

In the illustrated example, the first production stage 10 has four aligning and fixing stations 14*a*, 14*b*, 14*c*, 14*d*. In the aligning and fixing stations 14*a*, 14*b*, 14*c*, 14*d*, the laminating element is moved on the support element, for example, by means of articulated-arm robots, into a predefined relative position and reversibly fixed to the support element, so that the position of the laminating element relative to the support element does not change. As an alternative, the first production stage 10 may also be designed such that the supplying, the aligning and the fixing are implemented at a single universal work station and that the first production stage 10 has several, for example, four of these universal work stations.

The second production stage 20 according to alternative 2 has a second supplying station, an application station, a depositing station (none of which are shown), as well as the above-described warming station 22 and pressing station 24. In the second supplying station, an interior component is deposited in a known manner on the transport unit 30. In the application station, the lamination agent is applied in a known manner to the adhesive side of the laminating element and/or to the surface of the interior component to be laminated. Subsequently, the laminating element together with the support element is deposited in the depositing station on the interior component, so that the surface of the interior component to be laminated is covered by the laminating element. The support element preferably has a corresponding centering device, in order to facilitate a correct positioning of the laminating element on the interior component.

The transport unit 30 is then moved into the warming station 22 and press station 24. The releasing of the temporary fixing of the laminating element on the support element and the removal of the support element takes place downstream of the depositing station, preferably before the warming station 22, but may also take place downstream of the warming station 22 or the pressing station 24.

The above explanation of the method according to the invention and of the production system according to the invention describes the present invention exclusively within the scope of an example. Naturally, if technically meaningful, the sequence of individual process acts can be changed or additional process actions may he added without departing from the scope of the present invention.

LIST OF REFERENCE NUMBERS

1 Production system
10 First production stage
12*a* Supplying station
12*b* Supplying station
12*c* Supplying station
12*d* Supplying station
14*a* Aligning and fixing station
14*b* Aligning and fixing station
14*c* Aligning and fixing station
14*d* Aligning and fixing station
16*a* Arranging station
16*b* Arranging station
16*c* Arranging station
16*d* Arranging station
20 Second production stage
22 Warming station
24 Pressing station
26 Fixing station
30 Transport unit
T Transport direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for laminating interior components of vehicles, the method comprising the acts of:
providing at least one laminating element, at least one lamination agent and at least one interior component;
arranging on a transport unit the laminating element on a support element in a first main process;
transferring the laminating element and support element on the transport unit from a first production stage to a second production stage;
fixing the laminating element on an interior component on the transport unit while solidifying the lamination agent in a second main process, the lamination agent being arranged between the laminating element and the interior component; and
removing the laminated interior component from the transport unit after the fixing, wherein
the first main process is implemented in the first production stage and the second main process is implemented in the second production stage of the production system,
several first main processes are implemented in parallel in the first production stage, so that the first production stage and the second production stage have an essentially equally high production capacity.

2. The method according to claim 1, wherein
the first main process carries out a positioning and an alignment of the laminating element on the support element.

3. Method according to claim 2, wherein
the support element is constructed as an interior component.

4. Method according to claim 1, wherein
the support element is constructed as an interior component.

5. The method according to claim 3, wherein:
the support element has a topography which corresponds to an inverse image of the surface of the interior component to be laminated, and
the laminating element is correspondingly arranged on the support element, so that, during assembly of the support element with the interior component, the laminating element has a position that is predefined relative to the interior component.

6. The method according to claim 4, wherein:
the support element has a topography which corresponds to an inverse image of the surface of the interior component to be laminated, and
the laminating element is correspondingly arranged on the support element, so that, during assembly of the support element with the interior component, the laminating element has a position that is predefined relative to the interior component.

7. The method according to claim 1, wherein
during the arranging or after the arranging of the laminating element on the support element, the laminating element is fixed to the support element in a reversible manner by way of a clamping device or a temporary adhesion.

8. The method according to claim 1, wherein
the arranging of the laminating element on the support element takes place on a mobile transport unit.

9. The method according to claim 1, wherein
the laminating element and/or the lamination agent are subjected on the transport unit to at least one treatment process before the second main process.

10. The method according to claim 9, wherein the at least one treatment process comprises one or more of a thermal treatment or a chemical treatment.

11. The method according to claim 1, wherein
the solidification of the lamination agent takes place via pressure or temperature.

12. The method according to claim 11, wherein the pressure is applied to the laminating element via a top tool, a robot and/or a roller.

13. A production system, comprising:
- a plurality of transport units, each of which respectively receives at least one interior component;
- a plurality of arranging stations that arrange laminating elements on support elements, the support elements being arranged on the transport units; and
- a laminating facility having at least one fixing station for fixing laminating elements on the support elements, wherein the production system comprises at least twice as many arranging as fixing stations, and is configured to carry out laminating of interior components of a vehicle by:

- arranging the laminating element on the support element in a first main process;
- transferring the laminating element and support element on the transport unit from their respective arranging station to one of the at least one fixing stations;
- fixing the laminating element on an interior component while solidifying the laminating agent in a second main process, the lamination agent being arranged between the laminating element and the interior component, wherein the first main process is implemented in a first production stage and the second main process is implemented in a second production stage; and
- removing the laminated interior component from the transport unit after the fixing.

14. The production system according to claim 13, wherein the laminating facility has at least a top tool, a robot and/or a roller for pressing the laminating elements against the interior components.

* * * * *